United States Patent [19]

Wallestad

[11] Patent Number: 5,362,136
[45] Date of Patent: Nov. 8, 1994

[54] PROPORTIONING MODULE

[75] Inventor: Steven D. Wallestad, Kansas City, Mo.

[73] Assignee: Midland Brake, Inc., Kansas City, Mo.

[21] Appl. No.: 25,187

[22] Filed: Mar. 2, 1993

[51] Int. Cl.$^5$ ............................................. B60T 8/26
[52] U.S. Cl. .................................. 303/9.72; 303/9.75
[58] Field of Search ........ 303/7, 9.62, 9.66, 9.71–9.73, 303/9.75, 40, 52, 54, 9.74

[56] References Cited

U.S. PATENT DOCUMENTS

| | | | |
|---|---|---|---|
| 2,859,763 | 11/1958 | Fites | 137/102 |
| 3,183,042 | 5/1965 | Bueler | 303/52 |
| 3,190,700 | 6/1965 | Fites | 303/48 |
| 3,259,439 | 7/1966 | Bueler | 303/40 |
| 3,420,256 | 1/1969 | Kobnick | 137/102 |
| 3,459,000 | 8/1969 | Oberthür | 303/2 |
| 3,492,052 | 1/1970 | Klimek | 303/9.66 |
| 3,603,648 | 9/1971 | Reznicek et al. | 303/9.73 |
| 3,614,169 | 10/1971 | Bueler | 303/36 |
| 3,677,606 | 7/1972 | Shutt | 303/9.75 |
| 3,771,836 | 11/1973 | Bueler | 303/9.66 |
| 3,957,315 | 5/1976 | Cummins et al. | 303/9.76 |
| 3,964,794 | 6/1976 | Scholz | 303/9.69 |
| 4,118,076 | 10/1978 | Mild | 303/9.72 |
| 4,230,373 | 10/1980 | Plantan | 303/7 |
| 4,261,624 | 4/1981 | Plantan | 303/7 |
| 4,348,062 | 9/1982 | Koenig | 303/9.62 |
| 4,368,926 | 1/1983 | Bartholomew | 303/7 |
| 4,383,717 | 5/1983 | Bueler | 303/7 |
| 4,410,218 | 10/1983 | Bueler | 303/9.66 |
| 4,455,051 | 6/1984 | Falk | 303/9.66 |
| 4,455,052 | 6/1984 | Bueler | 303/9.66 |
| 4,571,007 | 2/1986 | Carmichael et al. | 303/7 |
| 4,575,157 | 3/1986 | Reinecke | 303/40 |
| 4,596,265 | 6/1986 | Goodell | 137/102 |
| 4,640,556 | 2/1987 | Fauck et al. | 303/40 X |
| 4,725,101 | 2/1988 | Szudy et al. | 303/9.66 |
| 4,758,051 | 7/1988 | Szudy et al. | 303/9.66 X |
| 4,775,192 | 10/1988 | Pohl et al. | 303/7 |
| 4,915,456 | 4/1990 | Gross et al. | 303/9 |
| 5,046,786 | 9/1991 | Johnston et al. | 303/7 |
| 5,154,585 | 10/1992 | Spencer | 417/364 |
| 5,186,522 | 2/1993 | Spencer | 303/1 |

FOREIGN PATENT DOCUMENTS

2030201  5/1991  Canada.

Primary Examiner—Robert J. Oberleitner
Assistant Examiner—Alfred Muratori
Attorney, Agent, or Firm—Leydig, Voit & Mayer, Ltd.

[57] ABSTRACT

A proportioning module for automatically changing the ratio of delivery pressure to control pressure according to whether a mode control pressure is present or absent. When the mode control pressure is present, the proportioning module is deactivated, causing the delivery pressure to be substantially equivalent to control pressure. When the mode control pressure is absent, the proportioning module functions to provide control pressure to delivery pressure ratios which are dependant upon the control pressure and the resultant delivery pressure.

19 Claims, 7 Drawing Sheets

PROPORTIONING MODULE

FIELD OF THE INVENTION

The present invention relates to proportioning modules used in vehicle braking systems, and more particularly, to an apparatus for automatically controlling the ratio of service pressure to delivery pressure in response to the presence or absence of a mode control pressure.

BACKGROUND OF THE INVENTION

The rear brakes of tractors of tractor-trailer vehicles are designed to accommodate the braking requirements of a fully loaded tractor-trailer combination, commonly referred to as the "trailering mode." Consequently, tractor rear brakes are comparatively oversized when the tractor is operated without the trailer, commonly referred to as the "bobtail mode." As a result, during bobtail operation, oversized tractor rear brakes typically promote premature rear brake lock, which can cause skidding, as well as poor vehicle stability and control.

Various solutions have been proposed in order to alleviate or minimize this problem. Anti-lock brake control systems can provide skid control. However, such skid control systems are expensive and require additional hardware and maintenance.

Proportioning modules are commonly used in the brake control systems of tractors. Proportioning modules generally operate to proportion brake service pressure between the front and rear tractor brakes to prevent premature rear brake lock and its attendant problems. Proportioning modules are disclosed, for example, in U.S. Pat. Nos. 4,410,218, 4,571,007, and 4,725,101. The disclosed proportioning modules override proportioning during bobtail operation when equal front-to-rear brake pressures are desirable, such as, for example, in an emergency created as a result of a failure of the tractor front brake circuit. Proportioning modules typically utilize primary proportioning means that are responsive to service pressure only. As a result, the disclosed modules typically require excessive force to operate the valve to provide desired proportioning ratios or "cut-back" features. Further, due to the high actuating forces required to operate the proportioning means, these modules are generally more complex and have larger packaging sizes than are desirable. Additionally, because the disclosed proportioning modules comprise proportioning means that are responsive to only service pressure, the potential operational response and relief curves are generally quite limited.

OBJECTS OF THE INVENTION

It is a primary object of the invention to provide a proportioning module which may be designed to provide desired operational application and relief curves. A related object is to provide a proportioning module that incorporates piston components and biasing means, the dimensions and spring forces of which may be designed to provide desired operational curves.

Another object of the invention is to provide a proportioning module wherein the primary proportioning piston is not solely responsive to the supplied service pressure.

A further object is to provide a proportioning module in which the required operating forces are reduced when compared with conventional modules.

An additional object is to provide a proportioning module having a reduced packaging size.

BRIEF SUMMARY OF THE INVENTION

In accomplishing these and other objectives of the invention, there is provided a proportioning module comprising a housing, a valve means and a feedback means. The proportioning module is adapted for use in the tractor rear brake system of a tractor-trailer vehicle. In the trailering mode, the trailer brake system supplies a mode control pressure to the module. When the mode control pressure is present, the module automatically provides delivery pressure which is substantially equivalent to service pressure. Conversely, when the tractor is in bobtail operation, the mode control pressure is absent. In this mode of operation, the module automatically proportions the brake system service pressure to delivery pressure in the tractor rear brakes.

Turning now to the structure of the module, the housing has a service port, which receives service pressure when the brake is applied, and a delivery port, which provides delivery pressure to the tractor rear brakes. The housing also includes a mode control port, which receives the mode control pressure supplied by the trailer brake system while trailering. In the bobtail mode, when the trailer brake system pressure is absent, the mode control port is vented to atmosphere.

The valve means is disposed within the housing between the service port and the delivery port, and comprises a valve disk and a proportioning piston downstream of the valve disk. When the module is operated in the bobtail mode, the proportioning piston responds to the service pressure and delivery pressure to proportion the pressure between the service and delivery ports within a predetermined service pressure range.

The feedback means comprises a feedback piston. At service pressures above the predetermined range, the feedback piston urges the proportioning piston out of sealing engagement with the valve disk. As service pressure continues to rise, the proportioning piston then tends to seat and unseat against the valve disk. This process provides a second proportioning ratio over a predetermined service pressure range.

Certain applications may require delivery pressures to be substantially equivalent to service pressures for high service pressure emergency brake applications. The proportioning module provides an automatic means for overriding proportioning to allow equalization of the service pressure and the delivery pressure, despite the absence of the mode control pressure. The cooperative movement of the movable seat and the feedback means can be adapted to unseat the movable seat from the valve disk at pressures above the predetermined proportioning ranges. As a result, substantially open flow is established between the service and delivery ports. Consequently, the module will provide delivery pressures substantially equivalent to service pressures at this higher predetermined service pressure range.

The proportioning ratios during brake application and release and the respective pressure ranges over which they are effective, depend upon the relationships between the pressure responsive surface areas of the proportioning piston, valve disk, and feedback piston, as well as the biasing means which apply forces to these components. According to an important aspect of the invention, a designer may select a relationship of spring rates and effective surface areas of the proportioning piston, valve disk, and feedback piston to provide desired proportioning ratios over desired service pressure ranges. Consequently, the proportioning module may be designed to provide desired application and release curves.

Moreover, the invention facilitates smaller packaging. This is achieved by utilizing a feedback piston which is solely or predominantly responsive to the delivery pressure. As the delivery pressure will always be less than or equal to the service pressure, smaller biasing means may be used to resist the motion of the feedback piston. Further, the feedback piston moves cooperatively with the proportioning piston during the higher predetermined proportioning range. As a result, the feedback piston provides additional unseating force without necessitating a larger pressure responsive surface area on the proportioning piston.

According to a further aspect of the invention, the proportioning module includes two pressure responsive means. The first pressure responsive means (the valve means including the proportioning piston) can be responsive to a combination of delivery and service control pressures and determines a proportioning ratio within a predetermined service pressure range. The second pressure responsive means (the feedback means) changes the proportioning ratio at pressures above a predetermined range. In a first embodiment, the second pressure responsive means is responsive to delivery pressure alone, while in alternative embodiments, to a combination of delivery and service pressures.

These and other features and advantages of the invention will be more readily apparent upon reading the following description of a preferred exemplified embodiment of the invention and upon reference to the accompanying drawings wherein:

It should be understood that the drawings are not necessarily to exact scale and that certain aspects of the embodiments are illustrated by schematic representations and phantom views. It should also be understood that when referring to physical relationships of components by terms such as "downstream" or the like, such terms have reference solely to the orientation depicted in the drawings relative to flow into the housing through the service port and out of the housing through the delivery port. Actual embodiments or installations thereof may differ.

While considerable mechanical details of a brake system, including other plan and section views of the particular embodiment depicting the invention within the proportioning module have been omitted, such detail is not per se part of the present invention and is considered well within the comprehension of those skilled in the art in light of the present disclosure.

DESCRIPTION OF THE PREFERRED EMBODIMENTS

While the invention will be described in connection with certain preferred embodiments, there is no intent to limit it to those embodiments. On the contrary, the intent is to cover all alternatives, modifications, and equivalents included within the spirit and scope of the invention as defined by the appended claims.

Figure 1:
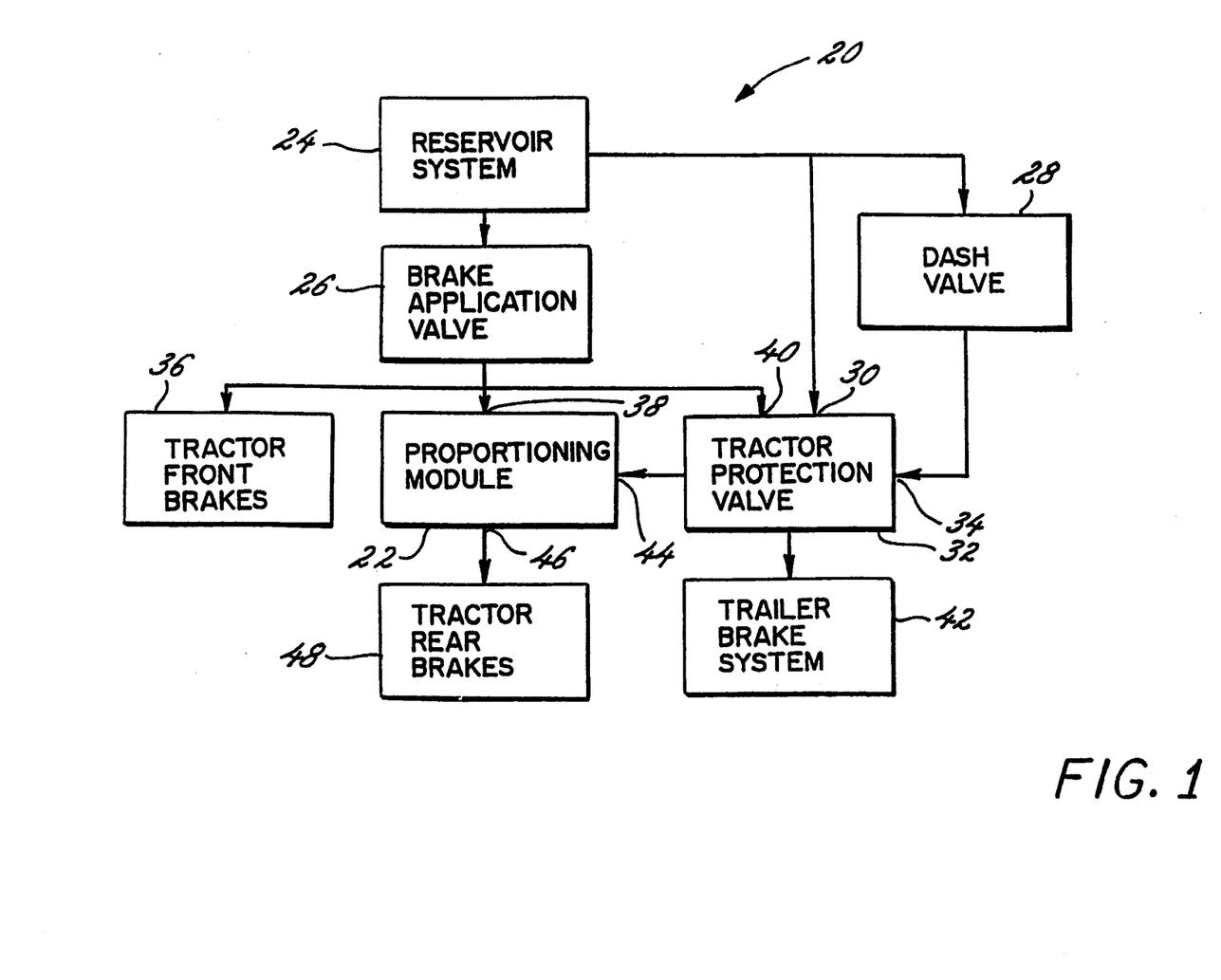
FIG. 1 is a simplified schematic diagram of a pneumatic braking system for a tractor-trailer combination vehicle.

Turning now to the drawings, FIG. 1 shows a schematic diagram of a pneumatic braking system 20 for a tractor-trailer combination vehicle. The schematic is simplified to focus on the present invention, and illustrates how the inventive proportioning module 22 may be utilized.

The braking system 20 illustrated comprises a single reservoir system 24, here shown generally supplying pressure to a brake application valve 26, a dash (or push-pull) valve 28, and the port 30 of a tractor protection valve 32, which generally supplies trailer emergency pressure. As may be seen, the dash valve 28 is further connected to the control port 34 of the tractor protection valve 32. While a representative braking system 20 is illustrated, it will be appreciated that the braking system 20 could be of an alternate design. For example, the braking system 20 might include separate reservoirs to service each component.

During operation, brake service pressure from the reservoir system 24 is modulated by the vehicle operator by means of the brake application valve 26. The modulated brake service pressure is applied directly to the tractor front brakes 36, to the proportioning module 22 by way of the service port 38, and to the tractor protection valve 32 by way of the service pressure port 40.

In accordance with the invention, when the tractor is operating with a trailer connected (trailering mode), modulated service pressure is supplied to the trailer brake system 42 through the tractor protection valve 32, and reservoir pressure is supplied to the proportioning module 22 at the mode control port 44 from the trailer emergency pressure system (shown here as coming directly from the tractor protection valve 32). The reservoir pressure received at the mode control port 44 deactivates the proportioning features of the proportioning module 22. As a result, in this mode of operation, the modulated service pressure from the brake application valve 26 flows directly through the proportioning module 22 through the delivery port 46 to provide substantially the same service pressure to the tractor rear brakes 48 as is supplied to the tractor front brakes 36.

Alternately, when the tractor is operating without a trailer connected (bobtail mode), the mode control port 44 of the proportioning module 22 is vented to atmospheric pressure. As a result, the proportioning features of the module 22 are activated to proportion the modulated service pressure received from the brake application valve 26 prior to delivering brake pressure to the tractor rear brakes 48, providing effective braking of the tractor and preventing premature brake lock.

Description—First Embodiment

Figure 2:
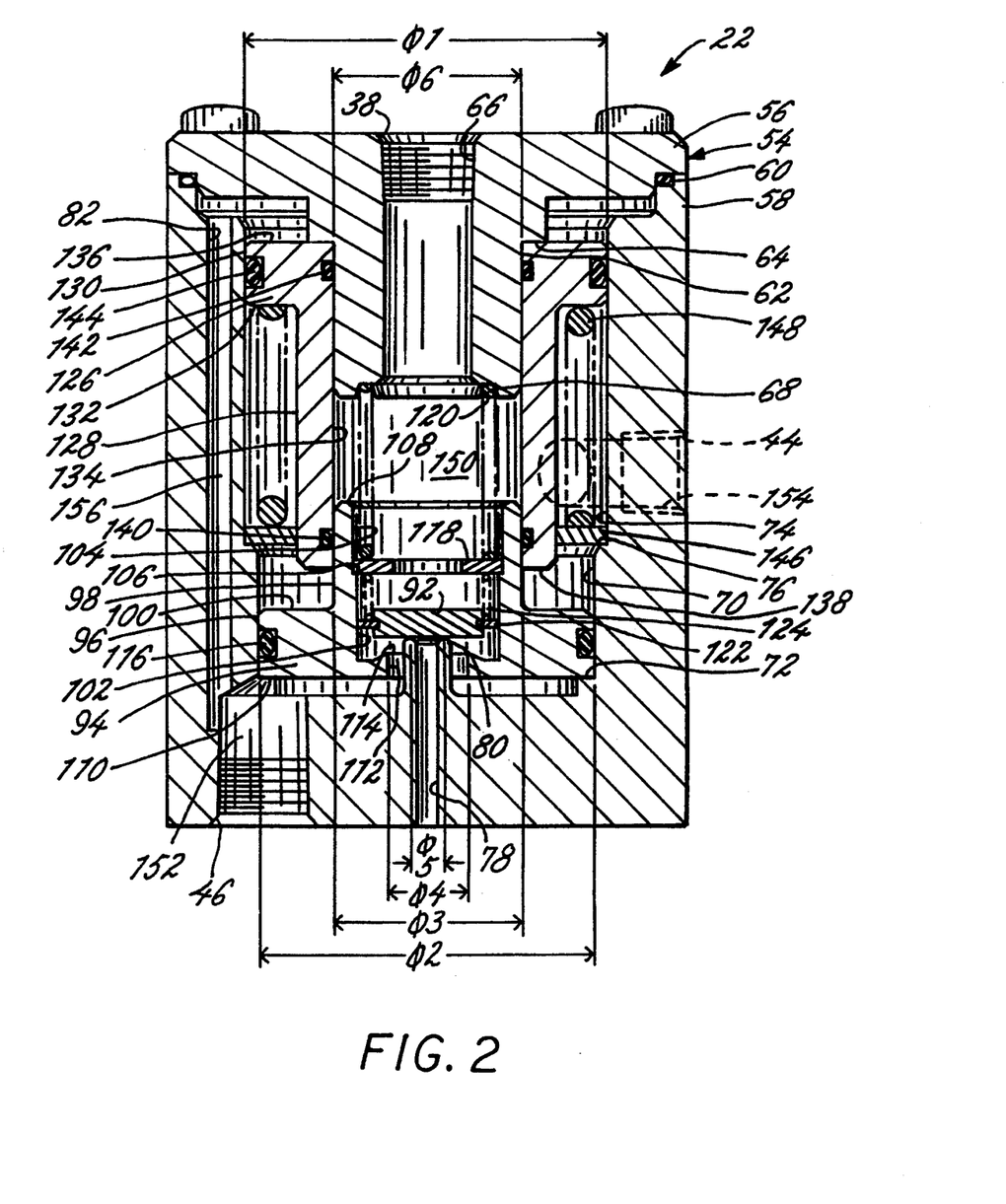
FIG. 2 is a sectional view of a first embodiment of a proportioning module assembly constructed in accordance with the teachings of the invention.

Referring now to FIG. 2, there is shown a proportioning module 22 constructed in accordance with the teachings of the invention. The proportioning module 22 generally comprises a housing assembly 54, a valve means comprising a valve disk 92 and a proportioning piston 94, and a cutback or feedback means comprising a feedback piston 126.

The housing assembly 54 is preferably made of a high strength rigid plastic material, metal, or the like. In the embodiment illustrated, the housing assembly 54 is formed of first and second housing portions 56, 58 connected together by any appropriate means (not shown), although it will be appreciated that the housing assembly 54 could be formed of any appropriate design. In this embodiment, the first and second housing portions 56, 58 are sealed by means of an O-ring 60 disposed therebetween, although an alternate sealing means may likewise be utilized.

The first housing portion 56 includes the service port 38, which receives the modulated service pressure from the brake application valve 26 (see FIG. 1). The second housing portion 58 includes the delivery port 46, which delivers brake pressure to the tractor rear brakes 48, as illustrated in FIG. 1 and explained above.

The first and second housing portions 56, 58 further include multiple surfaces, shoulders, and ports, the significance of which will be explained in greater detail with reference to other associated components of the proportioning valve 22. The first housing portion 56 includes an outer peripheral surface 62 with an annular shoulder 64 at its upper end, and a bore or inner peripheral surface 66 with an annular shoulder 68 at its lower end. As may be readily seen in FIG. 2, the bore or inner peripheral surface 66 defines the service port 38.

The second housing portion 58 includes a first bore 70 with an annular shoulder 72 disposed at its lower end, and a second bore 74 with an annular shoulder 76 disposed at its lower end. The second housing portion 58 further includes an exhaust port 78 having an elevated exhaust stem or annular valve seat 80 provided at its inner end, the mode control port 44 (shown in phantom), and a feedback bore 82.

In order to provide a desired proportioning ratio and control the flow through the housing assembly 54, a valve means is provided within the flow path between the service port 38 and the delivery port 46. The valve means comprises a valve disk member 92 and a moveable seat or proportioning piston 94, disposed downstream from the valve disk member 92.

The proportioning piston 94 includes first and second outer peripheral surfaces 96, 98 with an annular shoulder 100 being provided therebetween. The proportioning piston 94 further comprises first and second bores 102, 104 having an annular shoulder 106 disposed therebetween. An upper surface 108 is disposed adjacent the upper ends of the second outer peripheral surface 98 and the bore 104, and a lower surface 110 disposed adjacent the first outer peripheral surface 96.

The proportioning piston 94 further includes an opening or bore 112 extending from the lower surface 110 and being defined at its upper end by an annular valve seat 114. As shown in FIG. 2, the bore 112 is slidably disposed about the annular valve seat 80 of the second housing portion 58.

The proportioning piston 94 is slidably disposed along its first outer peripheral surface 96 within the first bore 70 of the housing assembly 54. In order to prevent the passage of fluid around peripheral surface 96 of the proportioning piston 94, the proportioning piston 94 carries a seal 116 in its peripheral surface 96 in contact with the wall of the bore 70.

A first biasing means generally biases the proportioning piston 94 in a downward position such that its lower surface 110 is seated against the annular shoulder 72 of the housing assembly 54. In the illustrated embodiment, the first biasing means comprises a stop ring 118, which is disposed against the annular shoulder 106 of the proportioning piston 94, and an in-shot spring 120, which extends between the annular shoulder 68 of the housing assembly 54 and the upper surface of the stop ring 118.

Turning now to the valve disk 92, the disk 92 is slidably disposed within the first bore 102 of the proportioning piston 94. The valve disk 92 is preferably formed of nitril rubber or the like molded around a metal disk, and is centered within the bore 102 by teeth 122 or the like, which permit flow around the valve disk 92. The valve disk 92 is generally biased by a second biasing means against the annular valve seat 80, to prevent flow through the exhaust port 78. In the illustrated embodiment, the second biasing means comprises a spring 124 disposed between the lower surface of the stop ring 118 and the upper surface of the teeth 122 of the valve disk 92. Thus, the valve disk 92 is biased into engagement with the annular valve seat 80 to prevent flow through the exhaust port 78.

While the first and second biasing means have been explained with reference to springs and related components, it will be appreciated that alternate biasing means are likewise suitable.

In order to provide a desired proportioning ratio at higher service control pressures, a feedback means is provided. The feedback means includes a feedback piston 126, which is slidably disposed within the bore 74 of the housing assembly 54. The feedback piston 126 includes a first outer peripheral surface 128, a second outer peripheral surface 130, and an annular shoulder 132 disposed therebetween. The feedback piston 126 further includes a bore 134, an upper surface 136, and a lower surface 138.

The feedback piston 126 is slidably disposed within the bore 74 of the housing assembly 54 and concentrically about the second outer peripheral surface 98 of the proportioning piston 94. To prevent the passage of fluid along the adjacent surfaces of the feedback piston 126 and the second housing portion 58, and the feedback piston 126 and the proportioning piston 94, a plurality of seals are provided. First and second seals 140, 142 are disposed in the bore 134 of the feedback piston 126 adjacent the second outer peripheral surface 98 of the proportioning piston 94, and adjacent the outer peripheral surface 62 of the first housing portion 56, respectively. Similarly, a third seal 144 is disposed in the second outer peripheral surface 130 of the feedback piston 126 in contact with the bore 74 of the second housing portion 58.

The feedback means further comprises means for biasing the feedback piston 126 in the upward position. The illustrated biasing means includes a stop ring 146, and a spring 148. The stop ring 146 is disposed within the bore 74 of the second housing portion 58, adjacent the annular shoulder 76, while the spring 148 is disposed between the upper surface of the stop ring 146 and the annular shoulder 132 of the feedback piston 126 to urge the feedback piston into engagement with the annular shoulder 64 of the first housing portion 56.

Operation of the proportioning module 22 may best be described with reference to a plurality of chambers which are formed within the module 22 as a result of the relationship of its components, and a plurality of surfaces upon which fluid forces are exerted. A service chamber 150 is formed within the first housing portion 56 above the proportioning piston 94 and within the bore 134 of feedback piston 126 in open fluid communication with service port 38. A delivery chamber 152 is formed within the second housing portion 58 below the proportioning piston 94, in open fluid communication with the delivery port 46. A mode control chamber 154 is formed within the second housing portion 58 between the proportioning piston 94 and the feedback piston 126, in open fluid communication with the mode control port 44. A feedback chamber 156 is also formed within the second housing portion 58 to provide open fluid communication between the delivery chamber 152 and the upper surface 136 of feedback piston 126.

It will be appreciated that the mode control chamber 154 is sealed off from the service chamber 150, the delivery chamber 152, and the feedback chamber 156 by seals 140, 116, and 144, respectively. When the components of the proportioning module 22 are in their unactuated positions, as shown in FIG. 2, the service, delivery, and feedback chambers 150, 152, and 156 are in open fluid communication. It will be appreciated from FIG. 2 that the service, delivery, and feedback chambers 150, 152, and 156 are not in fluid communication with exhaust port 78 when the module components are in the position shown because the valve disk 92 engages with the annular valve seat 80 to prevent flow.

The effective areas upon which the fluid forces act may best be described with reference to the diameters designated as $\Phi$ in FIG. 2. A first effective area $A_1$ is provided along the combination of upper surfaces on proportioning piston 94 between the outer peripheral surface 98 and the annular valve seat 114. Area $A_1$ is defined by the area between the diameters $\Phi 3$ and $\Phi 4$, and is subjected to control or service fluid pressure $P_s$ in the service chamber 150.

For the purposes of this disclosure, the components of the proportioning module 22 and its alternate embodiments will be defined as if the tolerances are such that the components abut, and the areas of the seals upon which the forces act is negligible. It will be appreciated, however, that in describing an area as including a surface of a particular component, it is contemplated that the area includes the surface of the component as well as the surface of appropriate seal(s), i.e., between the defining bore(s) and/or annular surface(s), when tolerances are greater.

A second effective area $A_2$ is provided along the lower surface 110 of proportioning piston 94 between the bore 70 of the second housing portion 58, and the annular valve seat 114. Area $A_2$ is defined by the area between the diameters $\Phi 2$ and $\Phi 4$, and is subjected to delivery fluid pressure $P_d$ in the outlet chamber 152. It will be appreciated that when the tolerances of the proportioning piston 94 and the second housing portion 58 are such that the outer peripheral surface 96 and the bore 70 do not coincide when assembled, the area $A_2$ includes the surface of the seal 116 which is exposed to delivery fluid pressure $P_d$.

A third effective area $A_3$ is provided along the upper surface 136 of the feedback means 126 between the outer peripheral surface 62 of the first housing portion 56 and the bore 74 of the second housing portion 58. Area $A_3$ is defined by the area between the diameters $\Phi 1$ and $\Phi 6$. Since the delivery and feedback chambers 152, 156 are in open fluid communication at all times, it will be appreciated that delivery pressure $P_d$ is equally present in both chambers 152, 156 at all times. Thus, area $A_3$ is likewise subjected to delivery pressure $P_d$ in the feedback chamber 156.

A fourth effective area $A_4$ is provided by the annular shoulder 132 and the lower surface 138 of the feedback means 126, between the outer peripheral surface 98 of the proportioning piston 94, and the bore 74 of the first housing portion 56. Thus, area $A_4$ is defined by the area between the diameters $\Phi 1$ and $\Phi 3$, and is subjected to mode control fluid pressure $P_m$ in the mode control chamber 154.

A fifth effective area $A_5$ is provided by the annular shoulder 100 of the proportioning piston 94 between outer peripheral surface 98 of the proportioning piston 94, and the bore 70 of the second housing portion 58. Area $A_5$ is defined by the area between the diameters $\Phi 2$ and $\Phi 3$, and is likewise subjected to mode control pressure $P_m$ in the mode control chamber 154.

Figure 3:
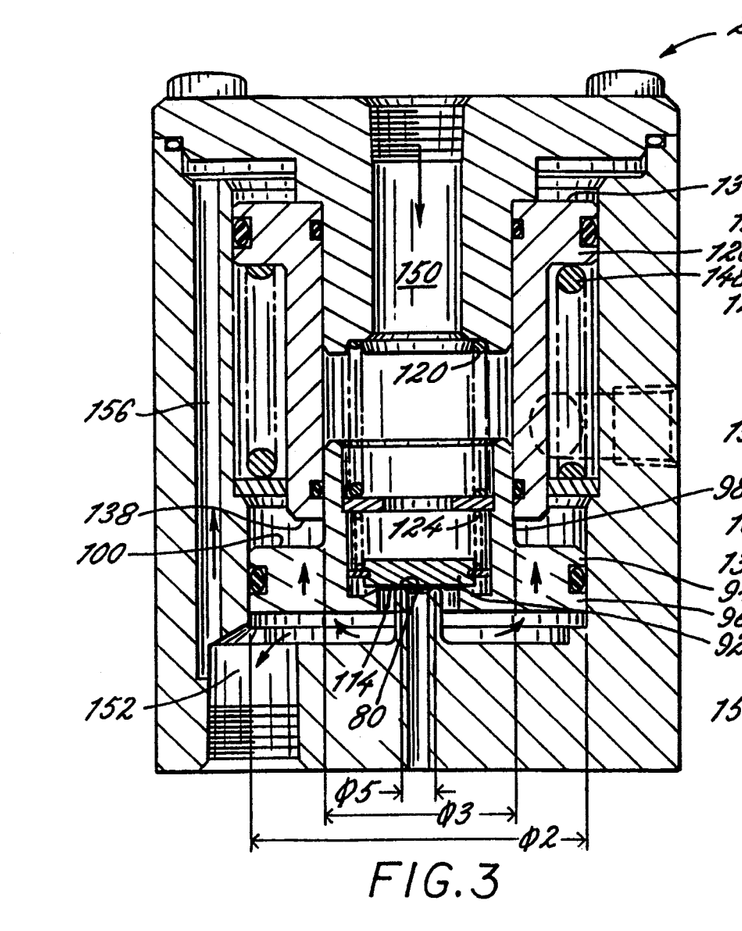
FIGS. 3, 4, and 5 are sectional views showing the respective positions of the valve disk, the proportioning piston, and the feedback piston of the proportioning module assembly of FIG. 2 during the potential proportioning modes of operation.

Turning now to the positions of the module 22 components as shown in FIG. 3, a sixth effective area $A_6$ is provided by the combination of the upper surfaces on the proportioning piston 94 and the valve disk 92, within the outer peripheral surface 98 of the proportioning piston 94. Thus, area $A_6$ is defined by the diameter $\Phi 3$, and is subjected to service pressure $P_s$ in the service chamber 150 when the valve disk 92 engages the annular valve seat 114 of the proportioning piston 94.

A seventh effective area $A_7$ is provided by the combination of the lower surfaces of the proportioning piston 94, and the valve disk 92 between the bore 70 of the second housing portion 58, and the opening defined by annular valve seat 80. Area $A_7$ is defined by the area between the diameters $\Phi 2$ and $\Phi 5$. Area $A_7$ is subjected to delivery pressure $P_d$ in the delivery chamber 152 when the proportioning piston 94 is in the position shown in FIG.3., i.e. the proportioning piston 94 has moved upward causing the annular valve seat 114 to engage the lower surface of the valve disk 92.

Returning now to the positions of the module 22 components as shown in FIG. 2, an eighth effective area $A_8$ is provided along the upper surface of the valve disk 92 within the opening defined by the annular valve seat 80. Area $A_8$ is defined by the diameter $\Phi 5$, and is subjected to service pressure $P_s$ in the service chamber 150.

A ninth effective area $A_9$ is provided along the lower surface of the valve disk 92 between the annular valve seats 80 and 114. Area $A_9$ is defined by the area between the diameters $\Phi4$ and $\Phi5$, and is subjected to delivery fluid pressure $P_d$ in the delivery chamber 152.

A tenth effective area $A_{10}$ is provided along the upper surface of valve disk 92 within the area defined by the annular valve seat 114. Area $A_{10}$ is defined by the diameter $\Phi4$, and is subjected to service pressure $P_s$ in the service chamber 150.

In the embodiment illustrated in FIGS. 2-5, $\Phi6$ is equal to $\Phi3$, i.e. $\Phi6=\Phi3$. Thus, it will be appreciated that in the position illustrated in FIG. 3, area $A_2$ is equal to area $A_1$ plus area $A_5$, i.e. $A_2=A_1+A_5$, and area $A_3$ is equal to area $A_4$, i.e. $A_3=A_4$.

Operation—Tractor-Trailer Combination

As indicated above, when a tractor is operated with a trailer, forming a tractor-trailer combination ("trailering mode"), full brake system pressure is required at both the front and the rear brakes 36, 48 (as shown in the schematic of FIG. 1) in order to provide the desired braking ability. Consequently, the proportioning module 22 is deactivated, so as to permit full brake system pressure to be supplied to both the front and rear brakes 36, 48 of the tractor. The relative positions of the module components in the deactivated mode are shown in FIG. 2.

Figure 6:
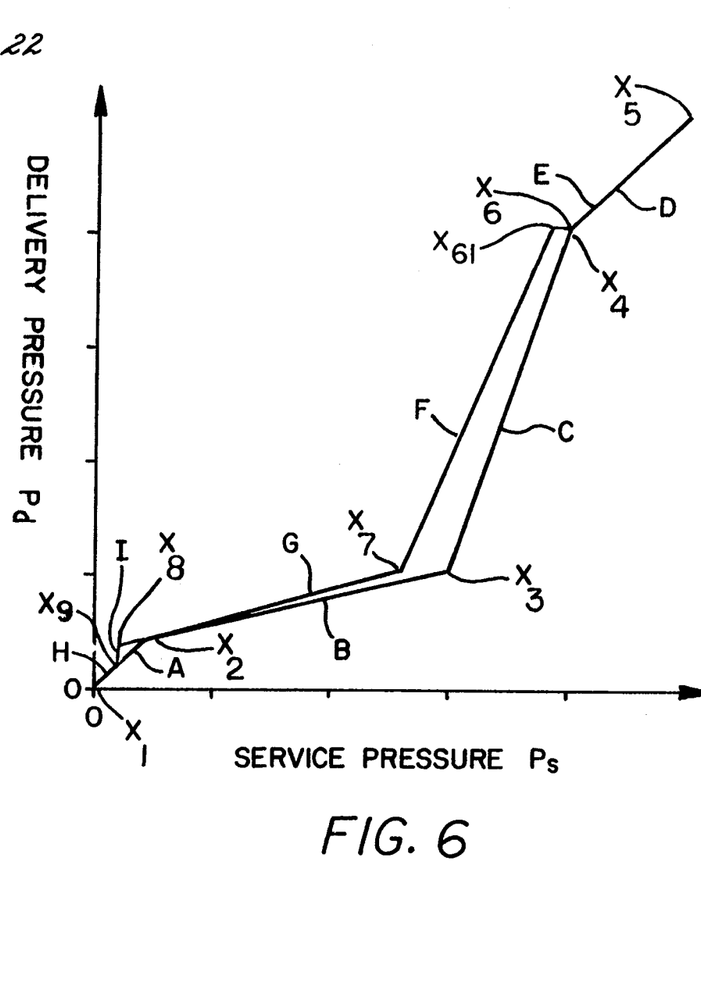
FIG. 6 is a graphical representation of delivery pressure as a function of service pressure for the embodiment of the invention illustrated in FIGS. 2, 3, 4, and 5.

In the trailering mode, the mode control port 44 receives the trailer emergency service pressure, which acts as mode control pressure $P_m$. The trailer emergency service pressure is generally received from the tractor protection valve 32. In this mode of operation, the emergency service pressure is typically on the order of 100-120 p.s.i. Pressure $P_m$ in the mode control chamber 154 acts upon the feedback means 126 over area $A_4$ producing an upward force $P_mA_4$, which holds the feedback means 126 upward against the shoulder 64. Similarly, pressure $P_m$ acts upon the proportioning piston 94 over area $A_5$ producing a downward force $P_mA_5$, which holds the proportioning piston 94 downward against the shoulder 72. It will thus be appreciated that in this mode of operation, the proportioning module 22 permits open bi-directional flow between the service port 38 and the delivery port 46. Consequently, delivery pressure $P_d$ in the delivery chamber 152 is equal to service pressure $P_s$ in service chamber 150. Referring now to FIG. 6, there is shown a graph of delivery pressure $P_d$ as a function of service pressure $P_s$. In this mode of operation the ratio of delivery pressure $P_d$ to service pressure $P_s$ is 1:1, i.e. $P_d=P_s$. Consequently, the trailering mode of operation is represented by the straight solid and dashed line extending from point $X_1$ through point $X_5$.

Operation—Tractor Only

When operating a tractor without a trailer ("bobtail mode"), it is desirable to reduce the brake system pressure supplied to the tractor rear brakes 48 relative to the pressure supplied to the tractor front brakes 36 (as shown in the schematic of FIG. 1). Operation of a tractor equipped with the inventive proportioning module 22 to achieve this proportioning feature may best be described with reference to FIGS. 2, 3, 4 and 5, and the graph shown in FIG. 6.

In operation, when the service port 38 receives a service pressure $P_s$ within a predetermined range, the proportioning module 22 provides a delivery pressure $P_d$ to the delivery port 46 proportioned relative to the service pressure $P_s$ received by service port 38. It will be appreciated from the following description of the operation of the embodiment of the proportioning module 22 illustrated in FIGS. 2-5, that the feedback piston 126 is responsive to the delivery pressure $P_d$ only.

In the bobtail mode, the mode control port 44 does not receive the trailer emergency service pressure. Rather, the mode control port 44 is in open communication with the atmosphere, and, therefore, atmospheric pressure. Thus, in the bobtail mode, mode control pressure $P_m$ in the mode control chamber 154 is minimal and provides no resistance to movement of the feedback piston 126 or the proportioning piston 94.

The relationship of delivery pressure $P_d$ relative to service pressure $P_s$ during proportioning operations of the module 22 may best be described with reference to FIG. 6. At point $X_1$ on the graph, both the service and delivery pressures $P_s$, $P_d$ are zero. Curve A, which extends from point $X_1$ to $X_2$, represents the relationship of delivery pressure $P_d$ to service pressure $P_s$ during brake application up to a predetermined service pressure as indicated by point $X_2$.

Referring again to FIG. 2, during operation along curve A, the service chamber 150 and the delivery chamber 152 are in open communication, as described with reference to trailering mode operation. Consequently, outlet pressure $P_d$ is equal to service pressure $P_s$, i.e. $P_d=P_s$. As service pressure $P_s$ rises to point $X_2$, it acts upon the proportioning piston 94 over areas $A_1$ and $A_2$ producing a net upward force $P_s(A_2-A_1)$. This net upward force causes the proportioning piston 94 to move upward, compressing the spring 120 until the annular valve seat 114 contacts the underside of the valve disk member 92. This contact closes fluid communication between the service chamber 150 and the delivery chamber 152. This lapped position is shown in FIG. 3.

Returning now to the graph shown in FIG. 6, from point $X_2$ to point $X_3$ along curve B, the movement of the proportioning piston 94 controls the increase in delivery pressure $P_d$ relative to the increase in service pressure $P_s$. The proportioning piston 94 remains in the lapped position until service pressure $P_s$ increases to a point where the force $P_sA_1$ and the force supplied by the spring 120 momentarily overcome the force $P_dA_2$. As a result, the proportioning piston 94 moves downward, disengaging the valve seat 114 from the valve disk 92 and reestablishing fluid communication between the service chamber 150 and the delivery chamber 152 (as illustrated in FIG. 2). Once fluid communication is reestablished, the delivery pressure $P_d$ again increases until the upward force $P_dA_2$ acting upon the proportioning piston 94 overcomes the downward force $P_sA_1$ and the force of the spring 120 to once again cause the annular valve seat 114 to contact the valve disk 92 (as illustrated in FIG. 3). Thus, along curve B the increase in delivery pressure $P_d$ relative to an increase in service pressure $P_s$ (the proportioning ratio) is dependent on areas $A_1$ and $A_2$ on proportioning piston 94, and can be stated as $\Delta(P_d)=\Delta(P_s)(A_1/A_2)$.

Figure 4:
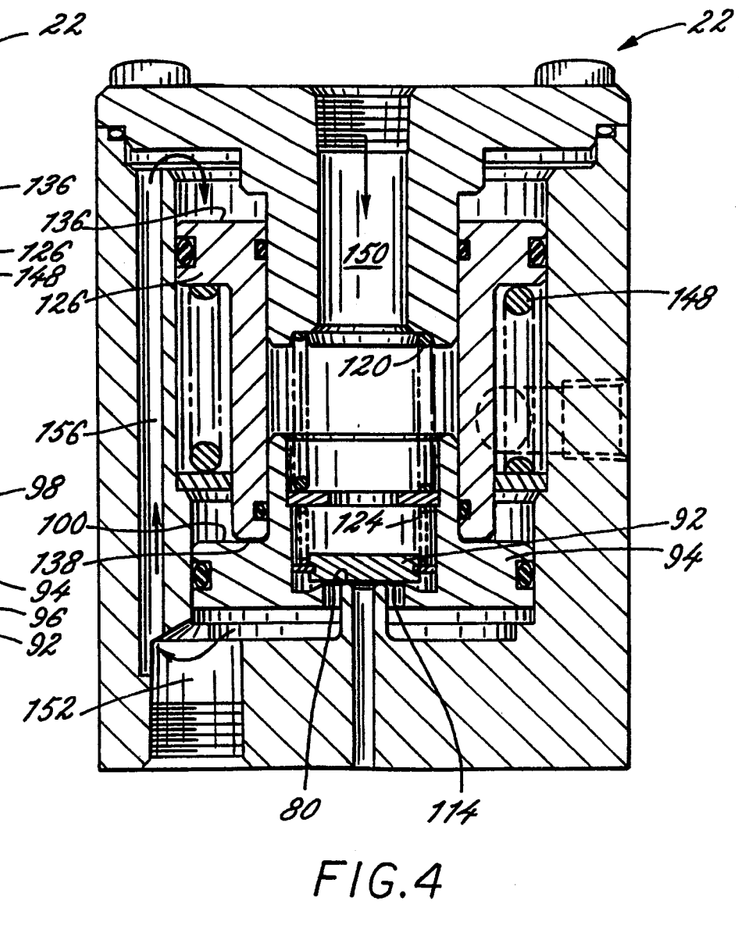

As the delivery pressure $P_d$ is likewise present in the feedback chamber 156, the increasing delivery pressure $P_d$ along curve B also acts upon the feedback means 126 over area $A_3$. This pressure produces a downward force $P_dA_3$, which causes the feedback means 126 to move downward compressing the spring 148. Proportioning continues along curve B, until at a predetermined service pressure and corresponding delivery pressure, the lower surface 138 of the feedback means 126 contacts the shoulder 100 of the proportioning piston 94. This position is shown in FIG. 4 and occurs at point $X_3$ on the graph shown in FIG. 6.

At point $X_3$ in FIG. 6, the proportioning ratio changes. From point $X_3$ to point $X_4$, along curve C, contact between the proportioning piston 94 and the feedback means 126 is maintained. The combined movement of these two pistons 94, 126 controls the increase in delivery pressure $P_d$ relative to the increase in service pressure $P_s$.

Figure 5:
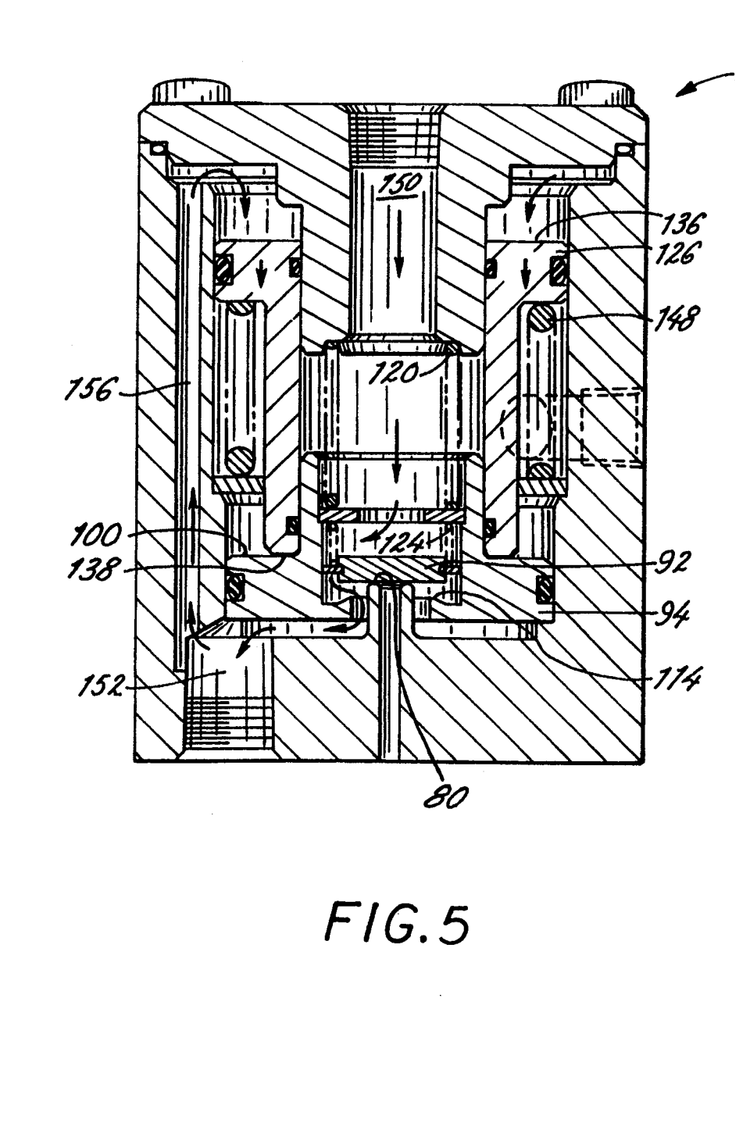

As service pressure $P_s$ increases, the downward forces ($P_sA_1$, $P_dA_3$, and the force of the spring 120) momentarily overcome the upward forces ($P_dA_2$ and the force supplied by the spring 148). At this point, the proportioning piston 94 and the feedback means 126 move downward, disengaging the valve seat 114 from valve disk 92 (as illustrated in FIG. 5). Once fluid communication is reestablished between the service chamber 150 and the delivery chamber 152, delivery pressure $P_d$ again increases until the upward force $P_dA_2$ on the proportioning piston 94 and the spring force of the spring 148 against feedback means 126 overcome the downward forces $P_sA_1$, $P_dA_3$ and the force of spring 120. At this point, the valve seat 114 of the proportioning piston 94 once again contacts valve disk 92 to provide the lapped position (as illustrated in FIG. 4).

Thus, along curve C, the increase in delivery pressure $P_d$ relative to an increase in service pressure $P_s$ (the proportioning ratio) is dependent on areas $A_1$ and $A_2$ on proportioning piston 94 and on area $A_3$ on feedback means 126, and can be stated as $\Delta(P_d)=\Delta(P_s)(A_1/(A_2-A_3))$. Proportioning continues along curve C until at point $X_4$ curve C intersects the line indicating an service to delivery ratio of 1:1. As those skilled in the art will appreciate, the delivery pressure $P_d$ cannot be greater than the service pressure $P_s$. Consequently, the proportioning ratio returns to 1:1 at point $X_4$.

From point $X_4$ to point $X_5$ along curve D, downward forces $P_sA_1$, $P_dA_3$ and the force of the spring 120 prevent the valve seat 114 of the proportioning piston 94 from contacting valve disk 92. This mode of operation is shown in FIG. 5.

The mode of operation shown in FIG. 5 also represents an emergency overriding feature of the inventive proportioning module 22. In an emergency, such as a tractor front brake system failure, rapid application of a high service pressure will cause proportioning module 22 to essentially operate along curve D only. As a result, full delivery pressure will be delivered to the tractor rear brake system 48 (shown in FIG. 1), without delay.

The relationships of the components of the proportioning module during the release of brake pressure may also be described with reference to the component positions illustrated in FIGS. 2–5, and the pressure diagram of FIG. 6. Assuming a full-pressure brake application has been achieved, the module components are generally as shown in FIG. 5. Service pressure $P_s$ applied as a result of application of the brake is released gradually through service port 38 and generally exhausted to the atmosphere. As fluid communication is provided between the delivery and service chambers 152, 150 in this position, delivery pressure $P_d$ is also initially exhausted through the service system in a 1:1 ratio.

As shown in FIG. 6, the relationship of delivery pressure $P_d$ to service pressure $P_s$ follows the curve identified as curve E. In this embodiment, curve E is essentially the same as curve D. As this initial exhausting occurs, the feedback means 126 and the proportioning piston 94 move upward until the annular valve seat 114 of the proportioning piston 94 contacts the valve disk 92. In this position, identified as point $X_6$ in FIG. 6, the valve disk 92 and the proportioning piston 94 are in a lapped position, as shown in FIG. 4. At this point, the forces of the service pressure $P_s$ acting on area $A_6$, the delivery pressure $P_d$ acting on area $A_3$, and the force of the spring 120 are all pushing downward. Conversely, the delivery pressure $P_d$ acting on area $A_7$, as well as the force of the spring 148, are pushing upward.

As shown in FIG. 4, the valve disk 92 is disposed in the lap condition on annular valve seat 80 and annular valve seat 114. Thus, referring now to FIG. 6, at $X_6$, the valve disk is held down by a force exerted by the spring means 124 and a force created by the service pressure $P_s$ acting on area $A_8$. (force of spring $120+P_sA_8$) To overcome this force, the service pressure acting on $A_6$ must drop sufficiently to allow delivery pressure acting on $A_7$ to balance the proportioning piston 94 and valve disc 92 in the lap condition. This point is identified as $X_{61}$ in FIG. 6. The drop in service pressure $\Delta P_6$ from $X_6$ to $X_{61}$ may be stated as $\Delta P_6=[P_{sx6}A_8+\text{force of spring } 124]/[A_6]$, where $P_{sx6}$ is the service pressure at $X_6$.

A further decrease in service pressure $P_s$ causes the force due to the delivery pressure acting upon area $A_7$, i.e. $P_dA_7$ (and the force of the spring 148) to momentarily overcome the downward forces (i.e. $P_sA_6+P_dA_3+\text{force of spring } 120$). In this way, the force $P_dA_7$ (and the force of the spring 148) pushes the proportioning piston 94 and the valve disk 92 upward, as well as the feedback piston 126, upward, lifting the valve disk 92 off the annular valve seat 80, establishing a flow path between the delivery chamber 152 and the exhaust port 78. (This position is not illustrated in the figures.) In this position, delivery pressure $P_d$ exhausts through the exhaust port 78.

This exhaustion corresponds to curve F, shown on the graph illustrated in FIG. 6. When the delivery pressure $P_d$ is sufficiently exhausted, the forces $P_sA_6$, $P_dA_3$ and the force of spring 120 return the proportioning piston 94 and the valve disk 92 to the lapped position (illustrated in FIG. 4).

Thus, beyond the initial 1:1 ratio of exhausting, the exhausting process has a first true proportioning ratio, which may be stated as $\Delta(P_d)=\Delta(P_s)(A_6)/(A_7-A_3)$ (disregarding the relatively low spring forces). This first true mode of proportioned exhausting continues until the downward force $P_dA_3$ on the feedback piston 126 is overcome by the force of the spring 148 and can no longer hold feedback piston 126 in contact with proportioning piston 94. At this point (identified as point $X_7$ in FIG. 6), the feedback means 126 continues to move upward until it engages shoulder 64.

With the feedback piston 126 and the proportioning piston 94 operating independently, the movement of the proportioning piston 94 and the valve disk 92 provide a second true mode of proportioned exhausting (illustrated as curve G in FIG. 6). The second true mode of proportioned exhausting is characterized by the force $P_dA_7$ applying an upward force sufficient to overcome the downward force $P_sA_6$ and the force of the spring 120. In this mode, the upward force $P_dA_7$ pushes the proportioning piston 94 and the valve disk 92 upward, lifting the valve disk 92 off the annular valve seat 80, establishing a flow path between the delivery chamber 152 and the exhaust port 78. (This position is not illustrated in the figures.) As a result of the open communication between the delivery chamber 152 and the exhaust port 78, delivery pressure $P_d$ further exhausts through the exhaust port 78 until force $P_sA_6$ and the force of the spring 120 return the proportioning piston 94 and the valve disk 92 to the lapped position shown in FIG. 2. Thus, the second true exhaust proportioning ratio is stated as $\Delta(P_d)=\Delta(P_s)(A_6)/(A_7)$.

This second true mode of proportioned exhausting continues until the upward forces overcome the downward forces on the valve disk 92. At this point, which is identified as point $X_8$ in FIG. 6, the delivery pressure $P_d$ pushes the valve disk 92 off the annular valve seats 80 and 114. As a result, open communication is established between the delivery chamber 152 and the supply chamber 150, and between the delivery chamber 152 and the exhaust port 78. It will be appreciated that delivery pressure $P_d$ exhausts to the same level as supply pressure $P_s$. This drop in delivery pressure follows curve I on FIG. 6.

As delivery pressure $P_d$ exhausts, the proportioning piston 94 is urged downward by the spring 120 and the service pressure $P_s$, causing the disk valve to reseat on the annular valve seat 80. As the proportioning piston 94 moves downward, the valve disk 92 does not reseat on the annular valve seat 114. This movement discontinues the communication between the supply chamber 152 and the exhaust port 78. However, continued communication between the delivery chamber 152 and the supply chamber 150 allows the remainder of delivery pressure $P_d$ to be exhausted through the service system. The delivery pressure $P_d$ exhausts through the service port 38 in a 1:1 ratio. This exhaustion is shown as curve H in FIG. 6.

According to an important aspect of the invention, the module 22 may be designed to provide desired brake pressure application and release curves (as illustrated in the graph of FIG. 6). In accomplishing this objective, the components of the module may be varied in order to adjust the curves as desired.

Description—Second Embodiment

Figure 7:
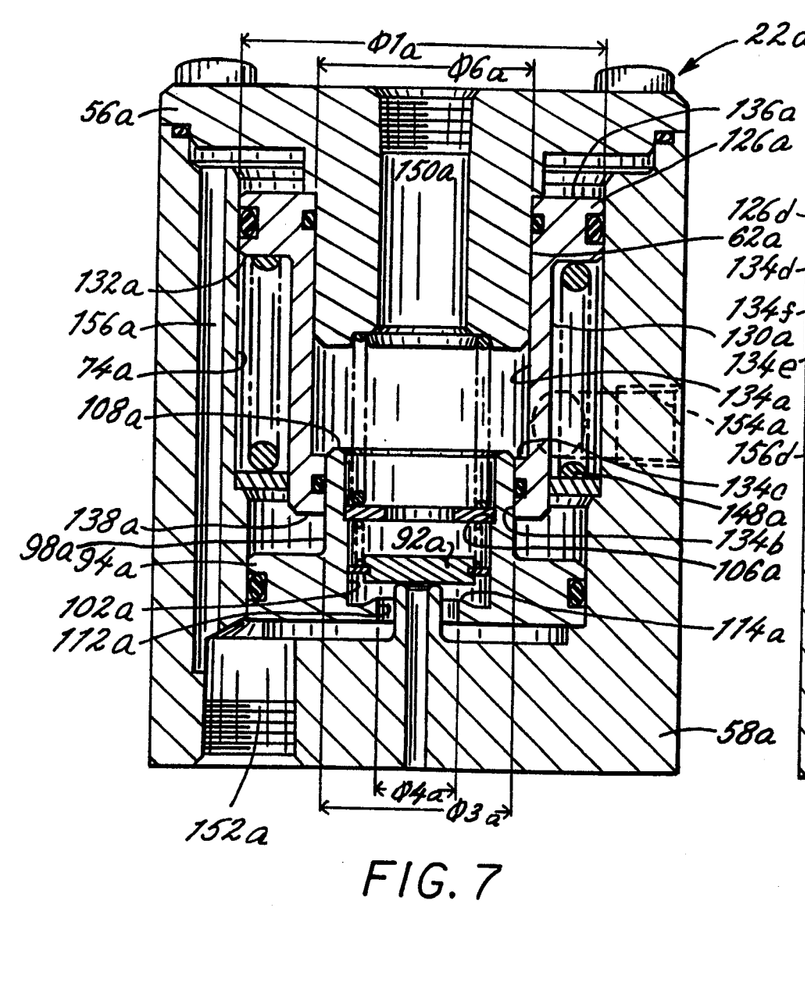
FIG. 7 is a sectional view of an alternative embodiment of the proportioning module assembly of FIG. 2 where, in the bobtail mode, the feedback piston is responsive to and urged in the same direction by the delivery and service pressures.

An alternative embodiment of the invention is illustrated in FIG. 7. In this embodiment, the proportioning module 22a is substantially the same as that shown in FIG. 2, except for the aspects of the components described hereafter. For ease of reference, like components, surfaces, etc., are designated by like numbers followed by letter suffixes a–c.

In this embodiment, the feedback piston 126a includes a stepped bore which comprises a first bore 134a and a second bore 134b, having an annular shoulder 134c formed therebetween. Consequently, the service pressure $P_{sa}$ and the delivery pressure $P_{da}$ act upon the feedback piston 126a against the mode control pressure $P_{ma}$ and the force of the spring 148a.

An effective area $A_{4a}$ is provided by the annular shoulder 132a and the lower surface 138a of the feedback piston 126a between the outer peripheral surface 98a of the proportioning piston 94a, and the bore 74a of the second housing portion 58a. This area $A_{4a}$ is defined by the difference between areas $\Phi 1a$ and $\Phi 3a$. Area $A_{4a}$ is subjected to mode control pressure $P_{ma}$ in the mode control chamber 154a to create an upward force $P_{ma}A_{4a}$.

As with the first embodiment, an effective area $A_{3a}$ is provided by the upper surface 136a on the feedback piston 126a between outer peripheral surface 62a of the first housing portion 56a, and the bore 74a of the second housing portion 58a. This area $A_{3a}$ is defined by the area between diameters $\Phi 1a$ and $\Phi 6a$. This area $A_{3a}$ is subjected to delivery pressure $P_{da}$ in feedback chamber 156a, creating a force $P_{da}A_{3a}$.

In this embodiment, when the valve disk 92a is not seated on the annular valve seat 114a, the annular shoulder 134c of the feedback piston 126a, along with the upper surface 108a and annular shoulder 106a of the proportioning piston 94a, and the proportioning piston 94a surface between the bore 102a and the bore 112a provides an effective area $A_{1a}$. The area $A_{1a}$ is defined by the area between the diameters $\Phi 6a$ and $\Phi 4a$. This area $A_{1a}$ is subjected to service pressure $P_{sa}$ in service chamber 150a when the valve disk 92a is not seated upon the annular valve seat 114a of the proportioning piston 94a, creating a force $P_{sa}A_{1a}$.

Alternately, when the valve disk 92a is seated on the annular valve seat 114a, the annular shoulder 134c of the feedback piston 126a, along with the upper surface 108a and annular shoulder 106a of the proportioning piston 94a, the upper surface of the proportioning piston 94a between bore 102a and the annular valve seat 114a, and the upper surface of the valve disk 92a provide an effective area $A_{6a}$. The surface area $A_{6a}$ is defined by the diameter $\Phi 6a$, and is subjected to service pressure $P_{sa}$ in the service chamber when the valve disk 92a is seated upon the annular valve seat 114a of the proportioning piston 94a, creating a force $P_{sa}A_{6a}$. It will thus be appreciated that the feedback piston 126a is acted upon by both the service and delivery pressures $P_{sa}$, $P_{da}$ to urge the piston 126a in the downward direction.

This alternative embodiment displays one way in which the proportioning curves shown in FIG. 6 may be affected by the particular shape of feedback means 126a. The addition of effective area along the surface 134c causes feedback means 126a to be acted on directly by service pressure $P_{sa}$, thus supplementing the downward force $P_{da}A_{3a}$ and allowing even greater flexibility in the design of proportioning curves.

Description—Third Embodiment

Figure 8:
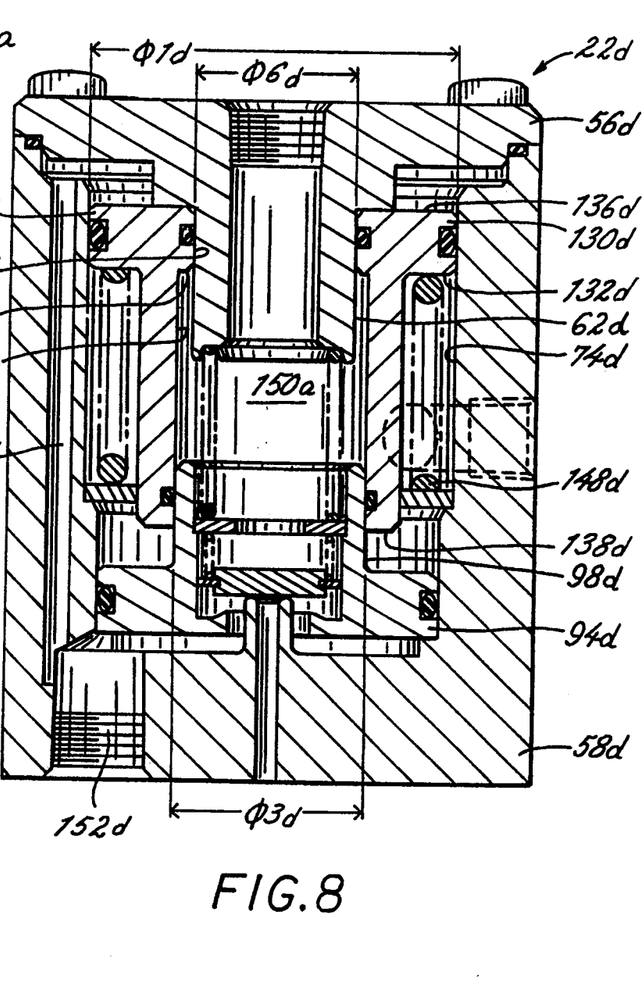
FIG. 8 is a sectional view of another alternative embodiment of the proportioning module assembly of FIG. 2 where, in the bobtail mode, the feedback piston is urged in a first direction in response to the delivery pressure while being urged in the opposite direction in response to the service pressure.

Another alternate embodiment of the invention is illustrated in FIG. 8. In this embodiment, the proportioning module 22d is substantially the same as that shown in FIG. 2, except for the aspects of the components described hereafter. For ease of reference, like components, surfaces, etc., are designated by like numbers, followed by letter suffixes d–f.

In this embodiment, the feedback piston 126d includes a stepped bore which comprises a first bore 134d and a second bore 134e, having an annular shoulder 134f formed therebetween. Consequently, the service pressure $P_{sd}$, the mode control pressure $P_{md}$ and the force of the spring 148d act against the delivery pressure $P_{dd}$ upon the feedback piston 126d.

An effective area $A_{4d}$ is provided by annular shoulder 132d and lower surface 138d of feedback piston 126d between bore 74d of the second housing portion 58d, and outer peripheral surface 98d of the proportioning piston 94d. This area $A_{4d}$ is defined by the area formed between diameters $\Phi 1a$ and $\Phi 3d$, and is subjected to mode control pressure $P_{md}$ in the mode control chamber 154d.

As with the first and second embodiments, an effective area $A_{3d}$ is provided by the upper surface 136d of the feedback piston 126d between the outer peripheral surface 62d of the first housing portion 56d, and the bore 74d of the second housing portion 58d. This area $A_{3d}$ is defined by the area provided between diameters $\Phi 1d$ and $\Phi 6d$. Area $A_{3d}$ is subjected to delivery pressure $P_{dd}$ in feedback chamber 156d, creating a downward force $P_{dd}A_{3d}$.

An effective area $A_{8d}$ is provided by the annular shoulder 134f between the outer peripheral surface 62d of the first housing portion 56d and the outer peripheral surface 98d of the proportioning piston 94d, defined by the area formed between diameters $\Phi 6d$ and $\Phi 3d$. Area $A_{8d}$ is subjected to service pressure $P_{sd}$ in service chamber 150d, to create an upward force on the feedback piston 126d, i.e. $P_{sd}A_{8d}$.

This alternative embodiment displays another way in which the proportioning curves shown in FIG. 6 may be affected by the particular shape of feedback piston 126d. The addition of the effective area $A_{8d}$ causes feedback piston 126d to be acted on directly by service pressure $P_s$. In this embodiment, however, the force created due to the service pressure $P_{sd}$ supplements the upward force of spring 148 in its resistance to downward force $P_{dd}A_{3d}$. It will thus be appreciated that the feedback piston 126d may be designed to provide even greater flexibility in achieving desired proportioning curves.

Description—Fourth Embodiment

Figure 9:
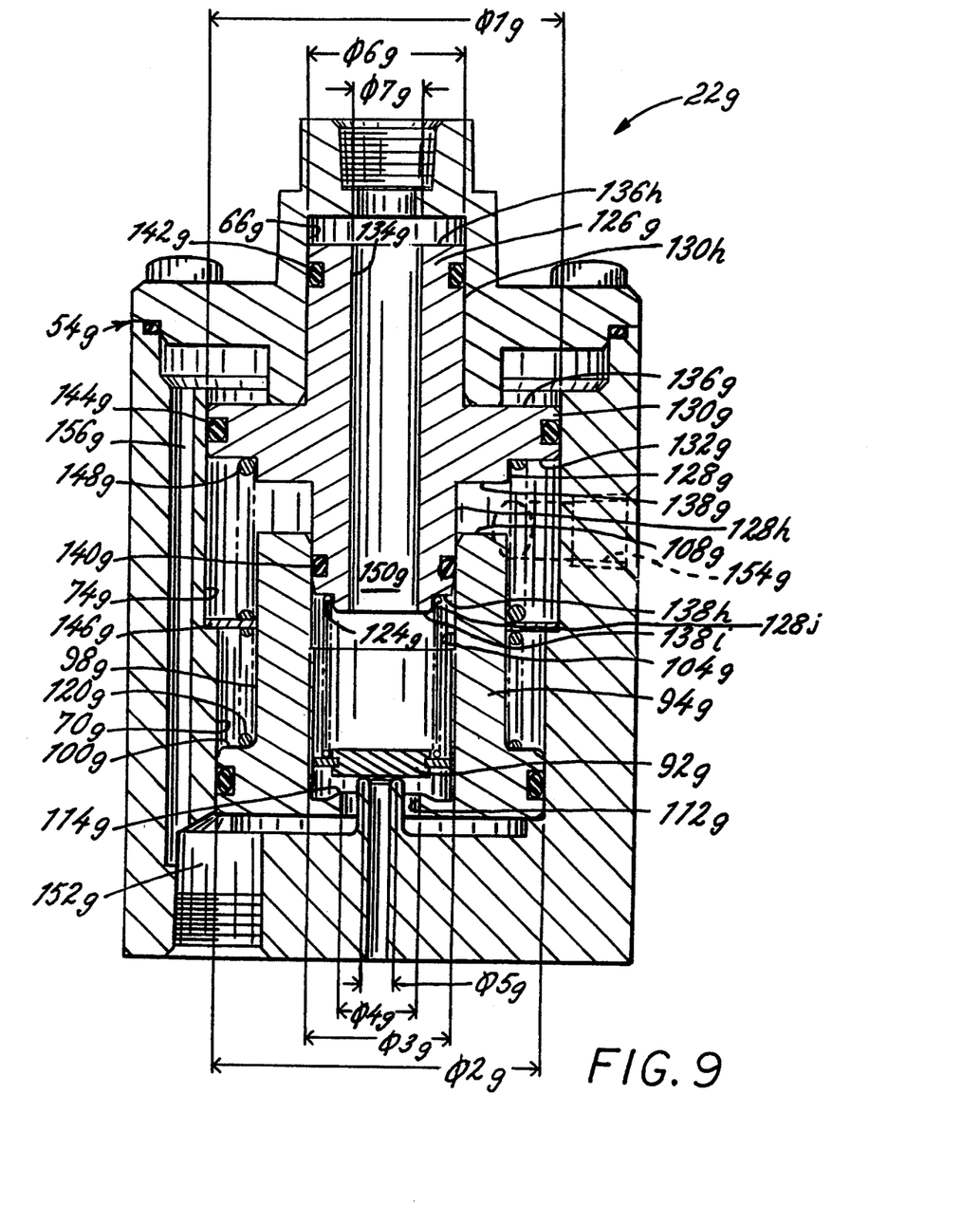
FIG. 9 is a sectional view of an alternative embodiment of the proportioning module assembly of FIG. 2 showing an alternative sealing and positional relationship between the proportioning piston and valve disk, and the feedback piston, and showing an alternative means of accomplishing the feature of FIG. 7 where the feedback means is responsive to and urged in the same direction by the delivery and service control pressures.

The currently preferred embodiment of the invention is shown in FIG. 9. This embodiment is generally preferred for manufacturability reasons. In this embodiment, the proportioning valve 22g is substantially the same as that shown in FIG. 2, except for the components described hereafter. For ease of reference, like components, surfaces, etc., are designated by like numbers, followed by letter suffixes g–i.

In this embodiment, the feedback piston 126g has a "t" cross-sectional shape having a bore 134g extending therethrough. The feedback piston 126g further includes a first outer peripheral surface 130h and a second outer peripheral surface 130g, having an annular shoulder 136g extending therebetween. The feedback piston 126g also includes a third outer peripheral surface 128g having an annular shoulder 132g at its upper end, a fourth outer peripheral surface 128h having an annular shoulder 138g at its upper end, and a fifth outer peripheral surface 128i having an annular shoulder 138h at its upper end. The feedback piston 126g also includes an upper surface 136h and a lower surface 138i.

The feedback piston 126g is slidably disposed within the bore 74g and the bore 66g of the housing assembly 54g, and the bore 104g of the proportioning piston 94g. The feedback piston 126g is biased in the upward direction by a biasing means 148g, such as a spring.

Similarly, the proportioning piston 94g is biased in the downward direction by a biasing means 120g, such as a spring. In this embodiment, however, the spring 120g is disposed about the outer peripheral surface 98g of the proportioning piston 94g, disposed between the annular shoulder 100g and the lower surface of the stop ring 146g. Further, the valve disk 92g is biased in the downward direction by a biasing means 124g, such as a spring, disposed directly between the annular shoulder 138h of the feedback piston 126g and the upper surface of the valve disk 92g.

It will be appreciated that in this embodiment an effective area $A_{5g}$ is formed by the annular surfaces 100g, 108g of the proportioning piston 94g. Area $A_{5g}$ is defined by the area between diameters $\Phi 2g$ and $\Phi 3g$. Mode control pressure $P_{mg}$ in the mode control chamber 154g exerts a downward force on the proportioning piston 94g, $P_{mg}A_{5g}$.

Similarly, an effective area $A_{4g}$ is formed by annular shoulders 132g and 138g of the feedback piston 126g. Area $A_{4g}$ is defined by the area between diameters $\Phi 1g$ and $\Phi 3g$. Mode control pressure $P_{mg}$ in mode control chamber 154g exerts an upward force on the feedback piston 126g acting along area $A_{4g}$, $P_{mg}A_{4g}$. It will also be seen from the drawings that an effective $A_{3g}$ is formed along the annular shoulder 136g of the feedback piston 126g. Area $A_{3g}$ is defined by the area between diameters $\Phi 1g$ and $\Phi 6g$. Delivery pressure $P_{dg}$ in the feedback chamber 156g acts upon area $A_{3g}$, exerting a force $P_{dg}A_{3g}$.

Additionally, an effective area $A_{1g}$ is created along the annular shoulders of the proportioning piston 94g between the bores 104g and 112g. This area is defined by the area between diameters $\Phi 3g$ and $\Phi 4g$. When the valve disk 92g is not seated upon the annular seat 114g of the proportioning piston 94g (as shown in FIG. 9), service pressure $P_{sg}$ acts upon this area, creating a downward force $P_{sg}A_{1g}$.

Similarly, when the valve disk 92g is seated on the annular seat 114g of the proportioning piston 94g (not illustrated), an effective area $A_{6g}$ is created along the annular shoulders of the proportioning piston 94g and the upper surface of the valve disk 92g. This area $A_{6g}$ is defined by the diameter $\Phi 3g$, and is acted upon by the service pressure $P_{sg}$ in the service chamber 150g when the valve disk 92g and the proportioning piston 94g are in the lapped condition, creating a downward force $P_{sg}A_{6g}$.

Finally, the surface pressure $P_{sg}$ in the service chamber 150g acts upon upper and lower surfaces 136h, 138i, 138h of the feedback piston 126g. An effective area $A_{8g}$ is formed along the lower surfaces 138h, 138i between the bore 134g and the outer peripheral surface 128h of the feedback piston 126g. This area is defined by the area between diameters $\Phi 3g$ and $\Phi 7g$. The service pressure $P_{sg}$ acts upon area $A_{8g}$ to exert an upward force $P_{sg}A_{8g}$. Similarly, an effective area $A_{8h}$ is created along the upper surface 136h of the feedback piston 126g, defined by the area between the diameters $\Phi 6g$ and $\Phi 7g$. The service pressure $P_{sg}$ acts on the area $A_{8h}$, exerting a downward force $P_{sg}A_{8h}$. It will be appreciated that in an embodiment where the diameters $\Phi 3g$ and $\Phi 6g$ are equal, the net force on the feedback piston 126g due to the service pressure $P_{sg}$ will be zero.

Description—Fifth Embodiment

Figure 10:
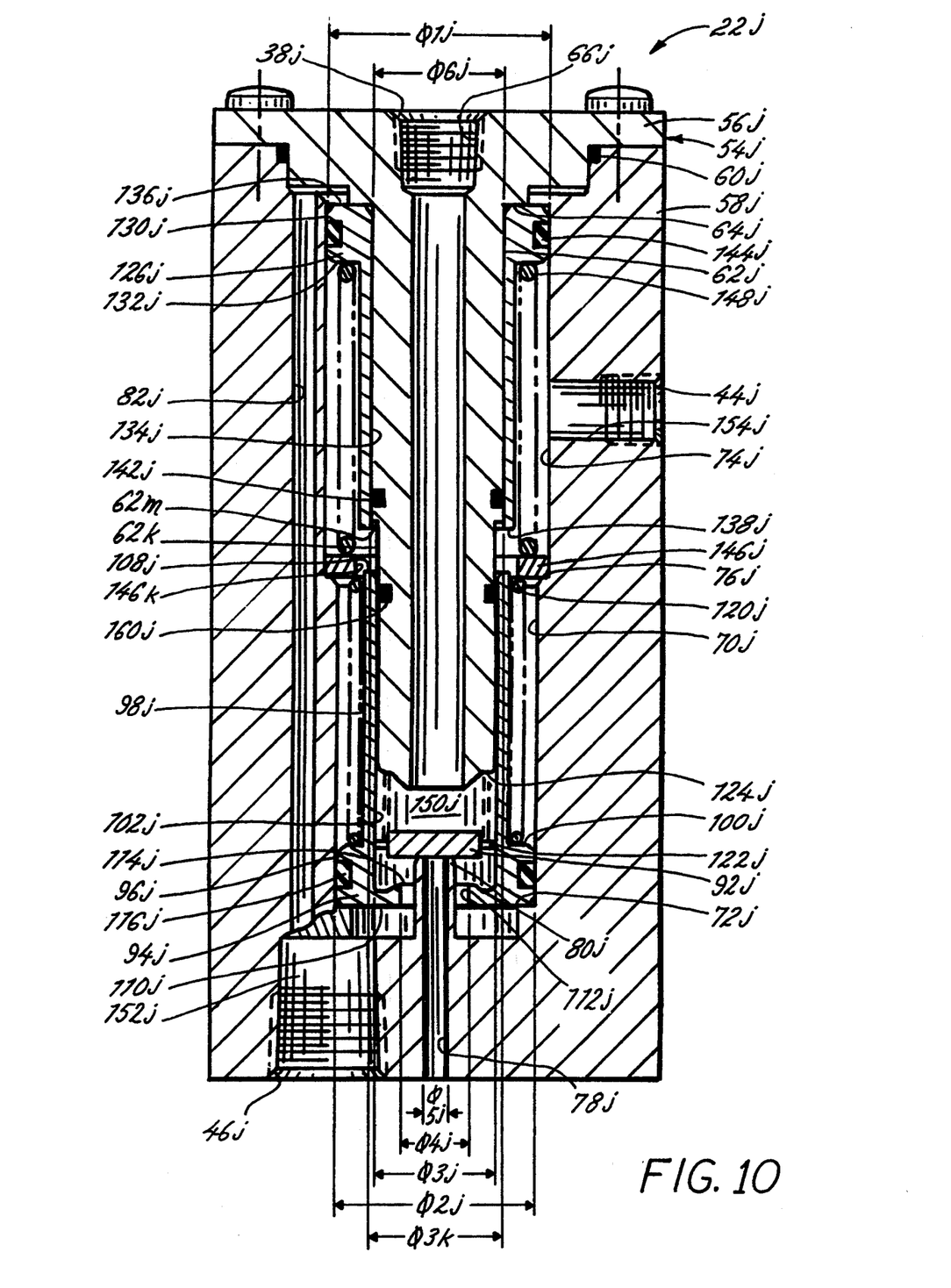
FIG. 10 is a sectional view of another alternative embodiment of the proportioning module assembly of FIG. 2 employing an alternative proportioning system.

Yet another embodiment of the invention is shown in FIG. 10. As with the embodiment described above, the proportioning valve 22j of this embodiment is substantially the same as that shown in FIG. 2, except for the components described hereafter. For ease of reference, like components, surfaces, etc., are designated by like numbers, followed by letter suffixes j–m.

In this embodiment, the first housing portion 56j has an elongated portion and the proportioning piston 94j is disposed about the outer peripheral surface of the elongated portion. Thus, the service pressure developed in the service chamber 150j does not act upon the annular shoulder 108j of the proportioning piston 94j. Rather, mode control pressure $P_{mj}$ developed in the mode control chamber 154j acts upon the annular shoulder 108j of the proportioning piston 94j.

More specifically, the outer peripheral surface of the first housing portion 56j includes a first outer peripheral surface 62j, a second outer peripheral surface 62k, and shoulder 62m disposed therebetween. It will be appreciated, however, that the first housing portion may include a uniform outer peripheral surface, rather than the stepped peripheral surface illustrated. The first and second outer peripheral surfaces 62j, 62k of the illustrated embodiment carry seals 142j, 160, respectively. As in the embodiment shown in FIGS. 2-5, 7 and 8, the feedback piston 126j is slidably disposed about the first outer peripheral surface 62j. In contrast to the alternate embodiments, however, the proportioning piston 94j is slidably disposed about the second outer peripheral surface 62k of the first housing portion 56j and within the first bore 70j of the second housing portion 58j.

Further, the proportioning piston 94j is urged to the downward position by a spring 120j disposed about the second outer peripheral surface 98j of the proportioning piston 94j, between the lower surface of the stop ring 146j and the annular shoulder 100j of the proportioning piston 94j. It will be appreciated that along its upper surface, the stop ring 146j likewise supports the spring 148j, which urges the feedback piston 126j upward. During operation, the proportioning piston 94j may slide upward about the first housing portion 56j such that the upper surface 108j extends through an inner opening 146k in the stop ring 146j. As a result, during proportioning modes, the annular surface 108j of the proportioning piston 94j and the annular surface 138j of the feedback piston 126j may abut when the proportioning piston 94j moves upward and/or the feedback piston 126j moves downward.

This embodiment includes a diameter $\Phi 3j$ which is defined by the bore 102j of the proportioning piston 94j, and a diameter $\Phi 3k$ which is defined by the bore 134j of the feedback piston 126j. Thus, diameter $\Phi 6j$ is equal to diameter $\Phi 3k$.

An effective area $A_{1j}$ is provided along the upper surface of the proportioning piston 94j between the bore 102j and the annular valve seat 114j. Area $A_{1j}$ is defined by the area between the diameters $\Phi 3j$ and $\Phi 4j$ and is subjected to service fluid pressure $P_{sj}$ in the service chamber 150j, creating a downward force $P_{sj}A_{sj}$.

Effective areas $A_{2j}$, $A_{3j}$, and $A_{4j}$ are substantially as described in connection with the embodiment shown in FIG. 2. More specifically, the second effective area $A_{2j}$ is provided along the lower surface 110j of the proportioning piston 94j between the outer peripheral surface 96j and the annular valve seat 114j. Area $A_{2j}$ is defined by the area between diameters $\Phi 2j$ and $\Phi 4j$, and is subjected to delivery fluid pressure $P_{dj}$ in the outlet chamber 152j, creating an upward force $P_{dj}A_{ej}$.

The third effective area $A_{3j}$ is provided along the upper surface 136j of the feedback means 126j between the bore 74j and the bore 134j. Area $A_{3j}$ is defined by the area between the diameters $\Phi 1j$ and $\Phi 6j$, and is subjected to delivery pressure $P_{dj}$ in the feedback chamber 156j, creating a downward force $P_{dj}A_{sj}$.

The fourth effective area $A_{4j}$ is provided by the annular shoulder 132j and the lower surface 138j of the feedback means 126j, between the bore 74j and the bore 134j. Thus, area $A_{4j}$ is defined by the area between diameters $\Phi 1j$ and $\Phi 3k$, and is subjected to mode control pressure $P_{mj}$ in the mode control chamber 154j, creating an upward force $P_{mj}A_{4j}$.

A fifth effective area $A_{5j}$ is provided by the annular shoulders 100j and 108j of the proportioning piston 94j, in contrast to the embodiment of FIG. 2. Area $A_{5j}$ is defined by the area between the diameters $\Phi 2j$ and $\Phi 3j$, and is likewise subjected to mode control pressure $P_{mj}$ in the mode control chamber 154j, creating a downward force $P_{mj}A_{sj}$.

When the proportioning piston 94j is in an upward position such that the valve disk member 92j is seated upon the annular seat 114j, a sixth effective area $A_{6j}$ is provided by the combination of the upper surfaces of the proportioning piston 94j within the bore 102j and the valve disk 92j. Thus, $A_{6j}$ is defined by the diameter $\Phi 3j$, and is subjected to service pressure $P_{sj}$ in the service chamber 150j, creating a downward force $P_{sj}A_{6j}$.

As with the embodiment shown in FIG. 2, a seventh effective area $A_{7j}$ is likewise provided by the combination of the lower surfaces of the proportioning piston 94j and the valve disk 92j between the bore 102j and the opening defined by the annular valve seat 80j when the annular seat 114j engages the valve disk 92j. Area $A_{7j}$ is defined by the area between diameters $\Phi 2j$ and $\Phi 5j$, and is subjected to delivery pressure $P_{dj}$ in the delivery chamber 152j, creating an upward force $P_{dj}A_{7j}$.

Further, when in the position shown in FIG. 10, effective areas $A_{8j}$, $A_{9j}$ and $A_{10j}$ are provided. More specifically, an eighth effective area $A_{8j}$ is provided along the upper surface of the valve disk 92j provided within the opening defined by the annular valve seat 80j. Area $A_{8j}$ is defined by the diameter $\Phi 5j$, and is subjected to service fluid pressure $P_{sj}$ in the service chamber 150j, creating a downward force $P_{sj}A_{8j}$.

A ninth effective area $A_{9j}$ is provided along the lower surfaces of the valve disk 92j between the annular valve seats 114j and 80j. Area $A_{9j}$ is defined by the area between diameters $\Phi 4j$ and $\Phi 5j$, and is subjected to delivery pressure $P_{dj}$ in the delivery chamber 152j, creating an upward force $P_{dj}A_{9j}$.

A tenth effective area $A_{10j}$ is provided along the upper surface of the valve disk within the area defined by the annular valve seat 114j. Area $A_{10j}$ is defined by the diameter $\Phi 4j$, and is subjected to service pressure $P_{sj}$ in the service chamber 150j, creating a downward force $P_{sj}A_{10j}$.

It will be appreciated that, because $\Phi 6j$ is equal to $\Phi 3k$, area $A_{3j}$ is equal to area $A_{4j}$, i.e. $A_{3j}=A_{4j}$. Further, area $A_{2j}$ is equal to area $A_{1j}$ plus area $A_{5j}$, i.e. $A_{2j}=A_{1j}+A_{5j}$.

This alternate embodiment displays yet another way in which the proportioning curves shown in FIG. 6 may be affected by the configuration of the components of the module, and, in particular, the location and shape of the proportioning piston 94j. The disposal of the surface 108j of the proportioning piston 94j about the outer peripheral surface 62k of the second housing portion 56j causes a reduction in the area of the proportioning piston 94j upon which the service pressure $P_{sj}$ acts, and an increase in the area upon which the mode control pressure $P_{mj}$ acts, thus reducing or increasing the downward force created due to the respective forces.

From the above explanation, it will be apparent that the proportioning module of the invention provides great flexibility in the design of desired proportioning curves, such as those illustrated in FIG. 6. The shapes of the module components and their relationships to each other, as well as the biasing means, may be designed to provide a desired delivery pressure for a given surface pressure for a given range.

It will be understood that the details, materials and arrangement of parts shown in the preferred embodiments have been described and illustrated to explain the nature of the invention. Changes may be made by those skilled in the art without departing from the principle and scope of the present invention as expressed in the appended claims.

What is claimed is:

1. A proportioning module for a brake system comprising:
    a housing having a service chamber communicating with a service port, a delivery chamber communicating with a delivery port, and a feedback chamber communicating with the delivery chamber, the housing being adapted to receive a service pressure at the service port and to provide delivery pressure at the delivery port,
    valve means movable in the housing for proportioning pressure between the service port and the delivery port within a first predetermined service pressure range, the valve means having a valve disk and a proportioning piston, the proportioning piston being disposed downstream of the valve disk and being movable in response to the service pressure and the delivery pressure, the proportioning piston being movable relative to the valve disk to effect a sealing engagement therebetween to control flow between the service chamber and the delivery chamber, and
    feedback means having a surface area adjacent the feedback chamber, the feedback means being movable in the housing in response to delivery pressures resulting from service pressures within a second predetermined service pressure range, the feedback means being responsive to higher delivery pressures in the feedback chamber to urge the proportioning piston out of sealing engagement with the valve disk.

2. The proportioning module of claim 1, wherein the housing further comprises a mode control chamber adapted to receive a mode control pressure for overriding the valve means and the feedback means whereby the delivery pressure is substantially equivalent to the service pressure throughout the entire service pressure operating range.

3. The proportioning module of claim 1, wherein the housing further comprises an exhaust port, the delivery pressure being released through the exhaust port upon a reduction in the control pressure.

4. The proportioning module of claim 3, wherein the valve disk is in sealing engagement with the exhaust port while the control pressure is not decreasing.

5. The proportioning module of claim 4, further comprising means for biasing the valve disk into sealing contact with the exhaust port.

6. The proportioning module of claim 1, wherein the proportioning piston is slidably disposed within the housing, the proportioning piston having a first surface area responsive to the service pressure and an opposed differential surface area responsive to the delivery pressure.

7. The proportioning module of claim 1, wherein the feedback means is slidably disposed within the housing, the feedback means having a surface area adjacent the service chamber such that the feedback means is responsive to the service pressure.

8. The proportioning module of claim 1, wherein the proportioning module operates below the first predetermined service pressure range to provide delivery pressure substantially equivalent to the control pressure.

9. The proportioning module of claim 1, wherein the proportioning piston responds to the service and delivery pressures within the first predetermined service pressure range to move independently of the feedback means into and out of sealing engagement with the valve disk to proportion the delivery pressure relative to the service pressure.

10. The proportioning module of claim 1, wherein the proportioning piston and the feedback means move cooperatively in response to the service and delivery pressures when the service pressure is within the second predetermined service pressure range to proportion the delivery pressure relative to the service pressure.

11. The proportioning module of claim 1, further comprising means for biasing the proportioning piston away from the valve disk.

12. The proportioning module of claim 1, further comprising means for biasing the feedback means away from the proportioning piston.

13. The proportioning module of claim 1, wherein the proportioning piston and the feedback means translate along a common axis and the proportioning piston, the feedback means and the valve disk are axially aligned.

14. A pneumatic braking system comprising:
    at least one pneumatically engaged brake for converting pneumatic pressure to braking force;
    a reservoir providing pneumatic service pressure for operating the brake;
    a manually operable brake application valve for varying the pneumatic service pressure supplied from the reservoir; and
    a pneumatic control valve for modulating the pneumatic service pressure transmitted from the reservoir through the manually operable brake application valve to the brake the pneumatic control valve modulating the pneumatic service pressure according to changes in the service pressure and delivering the modulated service pressure to the brake, the pneumatic control valve comprising:
        a housing having a service chamber communicating with a service port, a delivery chamber communicating with a delivery port, and a feedback chamber communicating with the delivery chamber, the housing being adapted to receive the service pressure from the pneumatic control valve at the service port and to provide the delivery pressure at the delivery port, the delivery port supplying the delivery pressure to the brake,
        valve means movable in the housing for proportioning pressure between the service port and the delivery port within a first predetermined service pressure range, the valve means having a valve disk and a proportioning piston, the proportioning piston being disposed downstream of the disk and being movable in response to the service and delivery pressures, the proportioning piston being movable relative to the valve disk to effect a sealing engagement therebetween to control flow between the service chamber and the delivery chamber, and
        feedback means having a surface area adjacent the feedback chambers the feedback means being movable in the housing in response to delivery pressures resulting from service pressures within a second predetermined service pressure range, the feedback means being responsive to the higher delivery pressures in the feedback chamber to urge the proportioning piston out of sealing engagement with the valve disk.

15. A valve system regulated by variation of a fluidic service pressure, including a fluidic delivery pressure proportional to the service pressure and an apparatus for automatically shifting the proportion of the delivery pressure to the service pressure, the apparatus comprising:

a housing having a service port, a delivery port, and a feedback chamber in fluid communication with the delivery port, the housing being adapted to receive the service pressure at the service port and to provide the delivery pressure at the delivery port and in the feedback chamber;

valve means movable in the housing for proportioning pressure between the service port and delivery port within a first predetermined service pressure range, the valve means having a valve disk and a proportioning piston, the proportioning piston being disposed downstream of the disk and being movable in response to the service and delivery pressures to control flow between the service port and the delivery port; and feedback means exposed to the delivery pressure in the feedback chamber, the feedback means being movable in the housing in response to delivery pressures resulting from service pressures above the predetermined service pressure range, the feedback means being responsive to the higher delivery pressures in the feedback chamber to urge the proportioning piston out of sealing engagement with the valve disk thereby permitting flow between the service port and the delivery port.

16. A proportioning module for a brake system comprising:

a housing having a service port for receiving service pressure from the brake system, a delivery port in fluid communication with the service port for providing delivery pressure to the brake system, and a feedback chamber;

a proportioning piston slidably disposed between the service port and the delivery port for controlling flow therebetween, the proportioning piston and the housing defining a delivery chamber adjacent the delivery port, the delivery chamber being in fluid communication with the delivery port and the feedback chamber such that the delivery pressure is present in both the delivery chamber and the feedback chamber, the proportioning piston having a surface area exposed to the service pressure and an opposed differential surface area exposed to the delivery pressure;

a valve disk disposed adjacent the proportioning piston, the proportioning piston operatively engaging the valve disk in response to changes in the delivery and service pressures for effecting a sealing engagement therebetween, the proportioning piston and the valve disk thereby controlling flow between the service port and the delivery chamber;

a feedback piston slidably disposed within the housing, the feedback piston having a surface area exposed to the delivery pressure in the feedback chamber such that the feedback piston moves to operatively engage the proportioning piston in response to changes in the delivery pressure.

17. A proportioning module as defined in claim 16 wherein the feedback piston includes a second surface area exposed to the service pressure such that the feedback piston is responsive to both the delivery pressure and the service pressure.

18. A proportioning module as defined in claim 17 wherein the second surface area of the feedback piston is disposed such that the service pressure and the delivery pressure urge the feedback piston in opposite directions.

19. A proportioning module as defined in claim 17 wherein the second surface area of the feedback piston is disposed such that the service pressure and the delivery pressure urge the feedback piston in the same direction.

* * * * *

UNITED STATES PATENT AND TRADEMARK OFFICE
CERTIFICATE OF CORRECTION

PATENT NO. : 5,362,136
DATED : NOVEMBER 8, 1994
INVENTOR(S) : STEVEN D. WALLESTAD

It is certified that error appears in the above-identified patent and that said Letters Patent is hereby corrected as shown below:

ON THE TITLE PAGE:

[57] ABSTRACT, last line after "pressure." insert new sentence -- A pneumatic brake system using the proportioning valve is also disclosed. --.

Column 20, line 35, after "brake" insert -- , --; and

Column 20, line 63, delete "chambers" and substitute therefor -- chamber, --.

Signed and Sealed this

Thirtieth Day of May, 1995

Attest:

Attesting Officer

BRUCE LEHMAN

Commissioner of Patents and Trademarks